(12) United States Patent
Kim

(10) Patent No.: US 9,030,801 B2
(45) Date of Patent: May 12, 2015

(54) MULTILAYER CERAMIC CAPACITOR AND METHOD OF MANUFACTURING THE SAME

(71) Applicant: Samsung Electro-Mechanics Co., Ltd., Suwon, Gyunggi-do (KR)

(72) Inventor: Hyung Joon Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 122 days.

(21) Appl. No.: 13/924,380

(22) Filed: Jun. 21, 2013

(65) Prior Publication Data

US 2014/0301013 A1 Oct. 9, 2014

(30) Foreign Application Priority Data

Apr. 8, 2013 (KR) .................. 10-2013-0038321

(51) Int. Cl.
 H01G 4/12 (2006.01)
 H01G 4/30 (2006.01)
 H01G 4/01 (2006.01)
 H01G 4/012 (2006.01)

(52) U.S. Cl.
 CPC . *H01G 4/30* (2013.01); *H01G 4/01* (2013.01); *Y10S 977/948* (2013.01); *H01G 4/012* (2013.01); *H01G 4/12* (2013.01); *H01G 4/1218* (2013.01)

(58) Field of Classification Search
 USPC ............... 361/321.2, 301.2, 301.4, 303–305, 361/306.1, 306.3, 321.1
 See application file for complete search history.

(56) References Cited

U.S. PATENT DOCUMENTS

| | | | | |
|---|---|---|---|---|
| 6,437,969 B2 * | 8/2002 | Mizuno et al. | ................ | 361/311 |
| 7,057,876 B2 * | 6/2006 | Fujioka et al. | ............. | 361/321.4 |
| 7,433,173 B2 * | 10/2008 | Iwasaki et al. | ............. | 361/321.4 |
| 8,059,388 B2 * | 11/2011 | Yamazaki et al. | ......... | 361/321.4 |
| 8,351,181 B1 * | 1/2013 | Ahn et al. | ................... | 361/321.2 |
| 8,437,115 B2 * | 5/2013 | Kim et al. | ...................... | 361/311 |
| 8,830,651 B2 * | 9/2014 | Yamaguchi | ................ | 361/301.4 |
| 2003/0016484 A1 | 1/2003 | Iwaida et al. | | |
| 2004/0233612 A1 | 11/2004 | Sugimoto et al. | | |
| 2007/0025055 A1 | 2/2007 | Mizuno et al. | | |

(Continued)

FOREIGN PATENT DOCUMENTS

| | | |
|---|---|---|
| JP | 05-129152 A | 5/1993 |
| JP | 11-354370 A | 12/1999 |
| JP | 2003-017356 A | 1/2003 |

(Continued)

OTHER PUBLICATIONS

Office Action issued on Mar. 4, 2014 in the corresponding Japanese Patent Application No. 2013-127231.

(Continued)

*Primary Examiner* — Nguyen T Ha
(74) *Attorney, Agent, or Firm* — McDermott Will & Emery LLP

(57) ABSTRACT

There is provided a multilayer ceramic capacitor including a ceramic body having first and second side surfaces facing each other, and third and fourth end surfaces connecting the first and second side surfaces, a plurality of internal electrodes formed in the ceramic body and having one ends thereof exposed to the third end surface or the fourth end surface, and a first side margin part and a second side margin part formed such that an average thickness thereof from the first and second side surfaces to edges of the internal electrodes is 18 μm or less.

12 Claims, 9 Drawing Sheets

(56) References Cited

U.S. PATENT DOCUMENTS

2012/0154978 A1 6/2012 Kim
2012/0229950 A1 9/2012 Kim et al.

FOREIGN PATENT DOCUMENTS

| | | |
|---|---|---|
| JP | 2004-356305 A | 12/2004 |
| JP | 2005-294738 A | 10/2005 |
| JP | 2007-35850 A | 2/2007 |
| JP | 2007-123835 A | 5/2007 |
| JP | 2012-129494 A | 7/2012 |
| KR | 10-1141342 B1 | 5/2012 |
| KR | 10-1141434 B1 | 5/2012 |

OTHER PUBLICATIONS

Notice of Office Action Korean Patent Application No. 10-2013-0038321 dated Jun. 20, 2014 with English translation.
Notice of Office Action Korean Patent Application No. 10-2013-0038321 dated Dec. 24, 2014 with full English translation.

* cited by examiner

B-B'

A-A'

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2013-0038321 filed on Apr. 8, 2013, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, a high capacitance multilayer ceramic capacitor having excellent reliability and a method of manufacturing the same.

2. Description of the Related Art

Generally, electronic components using a ceramic material, such as a capacitor, an inductor, a piezoelectric element, a varistor, a thermistor, or the like, include a ceramic body made of a ceramic material, internal electrodes formed in the ceramic body, and external electrodes mounted on external surfaces of the ceramic body so as to be connected to the internal electrodes.

Among ceramic electronic components, a multilayer ceramic capacitor includes a plurality of stacked dielectric layers, internal electrodes disposed to face each other, having the dielectric layer therebetween, and external electrodes electrically connected to the internal electrodes.

Multilayer ceramic capacitors have been widely used as components in mobile communications devices such as laptop computers, personal digital assistants (PDAs), mobile phones, and the like, due to advantages thereof such as a small size, high capacitance, ease of mounting, or the like.

Recently, as electronic products have been miniaturized and multi-functionalized, chip components have also tended to be miniaturized and multi-functionalized. As a result, there is a need to miniaturize multilayer ceramic capacitors and increase the capacity thereof.

In order to increase the capacitance of multilayer ceramic capacitors, methods of thinning the dielectric layers thereof, stacking the thinned dielectric layers, and improving coverage of the internal electrodes have been considered. In addition, a method for improving an area of the internal electrodes overlapped for forming capacitance has been considered.

In general, multilayer ceramic capacitors have been manufactured as follows. First, a ceramic green sheet is prepared, and a conductive paste is printed on the ceramic green sheet to form the internal electrode. The ceramic green sheets having the internal electrodes formed thereon are stacked in an amount of several tens of layers to several hundreds of layers to fabricate a green ceramic multilayer body. Thereafter, the green ceramic multilayer body is compressed under conditions of high temperature and high pressure to fabricate a hard green ceramic multilayer body, and a cutting process is performed on the ceramic multilayer body to fabricate a green chip. Next, the green chip is calcined and sintered, and the external electrodes are formed thereon to complete the multilayer ceramic capacitor.

In the case of manufacturing a multilayer ceramic capacitor through the above-described manufacturing method, since it is difficult to significantly decrease a margin part region of the dielectric layer on which the internal electrode is not formed, there is a limitation in increasing the overlap area of the internal electrodes. In addition, since the margin part of an edge of the multilayer ceramic capacitor is formed to be thicker than margin parts in other regions, it is not easy to remove carbon therefrom at the time of calcining and sintering.

In order to solve the above-described limitations, a method, in which the margin part region on which the internal electrode is not formed is formed in the previously manufactured ceramic multilayer body, has been considered, but the method has a defect in that the manufactured ceramic multilayer body has decreased moisture-resistance characteristics and is vulnerable to impacts due to a non-compression area between the ceramic multilayer body and the margin part.

The related art document below variably controls an average grain size of dielectric grains configuring the capacitance part and an average grain size of dielectric grains configuring the specific capacitance part, but does not solve the above-described defects.

RELATED ART DOCUMENT (Patent Document 1) JP 2003-017356

SUMMARY OF THE INVENTION

An aspect of the present invention provides a high capacitance multilayer ceramic capacitor having excellent reliability and a method of manufacturing the same.

According to an aspect of the present invention, there is provided a multilayer ceramic capacitor including: a ceramic body having first and second side surfaces facing each other, and third and fourth end surfaces connecting the first and second side surfaces; a plurality of internal electrodes formed in the ceramic body and having one ends thereof exposed to the third end surface or the fourth end surface; and a first side margin part and a second side margin part formed such that an average thickness thereof from the first and second side surfaces to edges of the internal electrodes is 18 μm or less, and wherein the ceramic body includes an effective layer contributing to capacitance formation and a cover layer provided on at least one of an upper portion and a lower portion of the effective layer, and when an average grain size of dielectric grains in the first side margin part and the second side margin part is defined by Gw, an average grain size of dielectric grains in the cover layer is defined by Gt, and an average grain size of dielectric grains in the effective layer is defined by Ga, Gw<Gt<Ga is satisfied.

The average grain size Gw of the dielectric grains in the first side margin part and the second side margin part may be 100 to 120 nm.

The average grain size Ga of the dielectric grains in the effective layer may be 150 to 160 nm.

The first side margin part and the second side margin part may be formed of a ceramic slurry.

The internal electrode may include a first internal electrode having one end exposed to the third end surface and the other end formed so as to have a predetermined interval from the fourth end surface, and a second internal electrode having one end exposed to the fourth end surface and the other end formed so as to have a predetermined interval from the third end surface.

According to another aspect of the present invention, there is provided a method of manufacturing a multilayer ceramic capacitor, the method including: forming a plurality of ceramic green sheets by using a first ceramic slurry containing a first ceramic dielectric powder; printing a first internal electrode pattern or a second internal electrode pattern on the respective ceramic green sheets; stacking the plurality of ceramic green sheets such that the first internal electrode pattern and the second internal electrode pattern are alternately stacked to form an effective layer contributing to capacitance formation, and stacking ceramic green sheets formed by using a second ceramic slurry containing a second ceramic dielectric powder having a grain size smaller than that of the first ceramic dielectric powder on at least one of an upper portion and a lower portion of the effective layer to form a cover layer, thereby preparing a ceramic body having first and second side surfaces facing each other and third and fourth end surfaces connecting the first and second side surfaces; and forming a first side margin part and a second side margin part by applying a third ceramic slurry containing a third ceramic dielectric powder having a grain size smaller than that of the second ceramic dielectric powder to the respective first and second side surfaces.

When an average grain size of dielectric grains in the first side margin part and the second side margin part is defined by Gw, an average grain size of dielectric grains in the cover layer is defined by Gt, and an average grain size of dielectric grains in the effective layer is defined by Ga, Gw<Gt<Ga may be satisfied.

An average grain size Gw of dielectric grains in the first side margin part and the second side margin part may be 100 to 120 nm.

An average grain size Ga of dielectric grains in the effective layer may be 150 to 160 nm.

The plurality of ceramic green sheets, the first side margin part, and the second side margin part may be sintered at a temperature of 800 to 1200° C.

The method may further include forming a first external electrode and a second external electrode connected to the first internal electrode pattern exposed to the third end surface and the second internal electrode pattern exposed to the fourth end surface, respectively.

The first side margin part and the second side margin part may have an average thickness of 18 μm or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
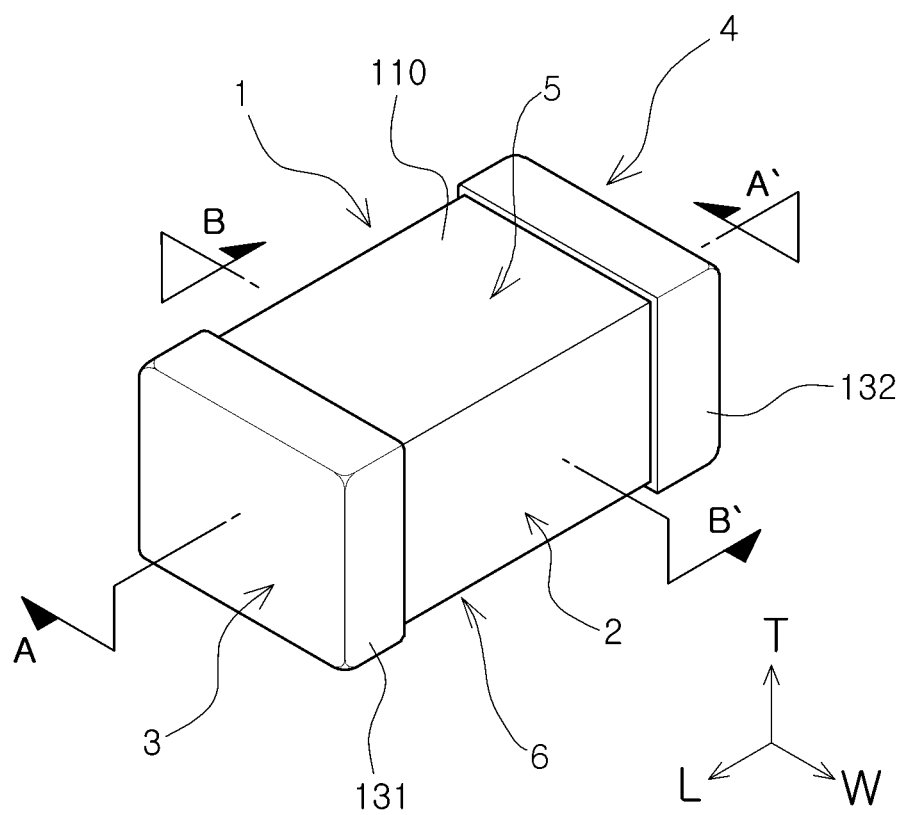
FIG. 1 is a schematic perspective view showing a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a schematic perspective view showing a multilayer ceramic capacitor according to an embodiment of the present invention.

Figure 2:
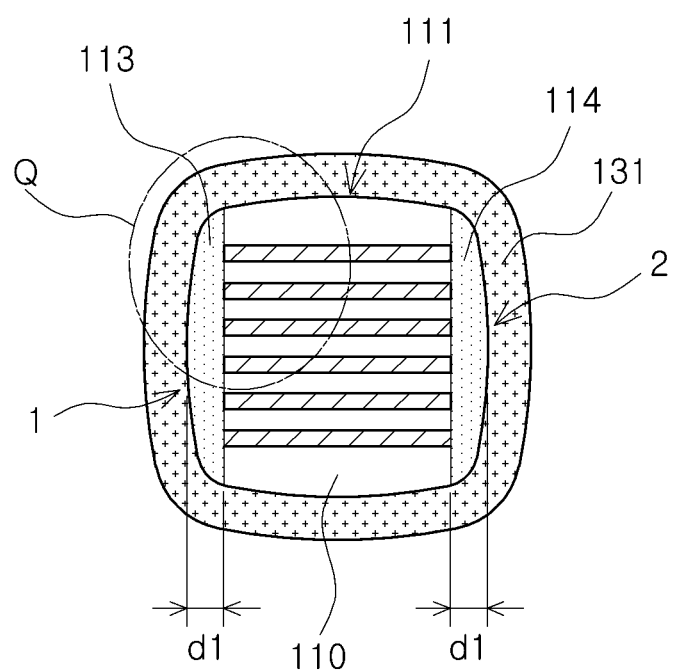
FIG. 2 is a cross-sectional view taken along line B-B' of FIG. 1.

FIG. 2 is a cross-sectional view taken along line B-B' of FIG. 1.

Figure 3:
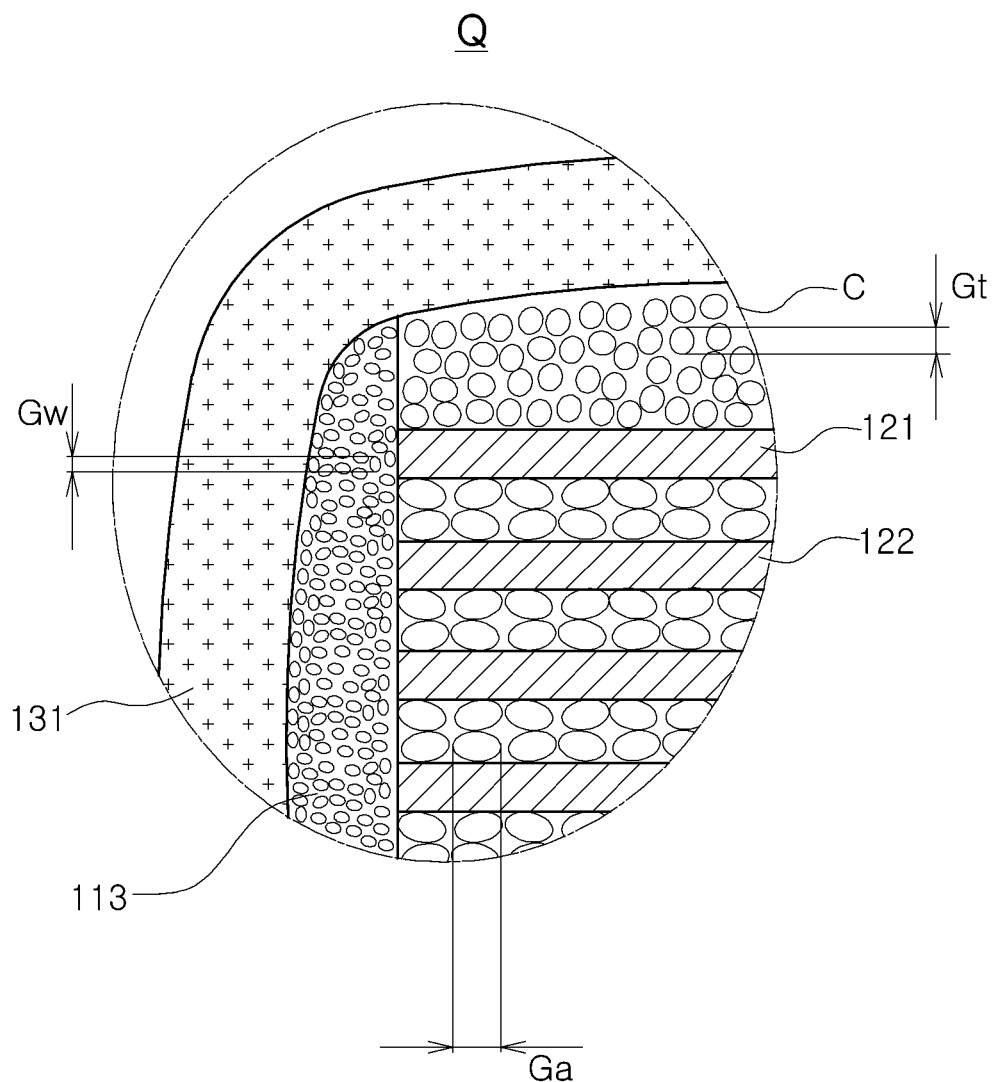
FIG. 3 is an enlarged view of region Q of FIG. 2.

FIG. 3 is an enlarged view of region Q of FIG. 2.

Figure 4:
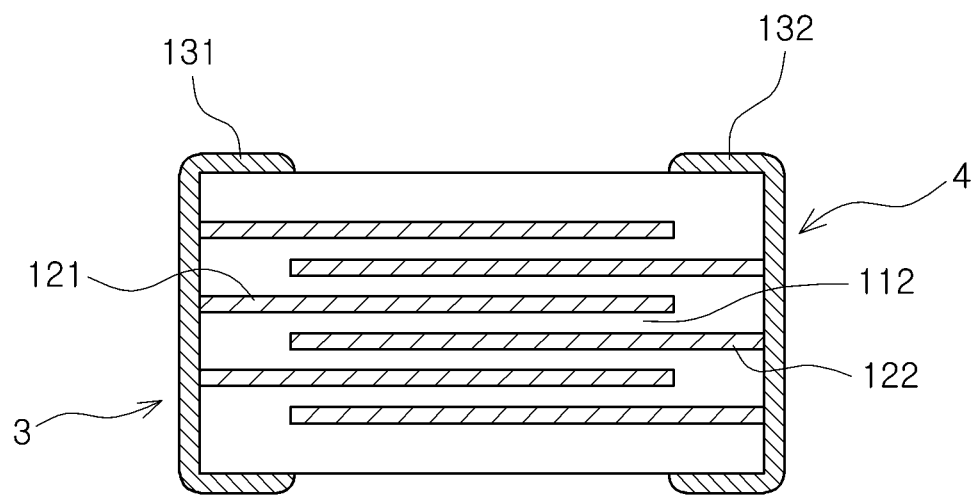
FIG. 4 is a cross-sectional view taken along line A-A' of FIG. 1.
Figure 5:
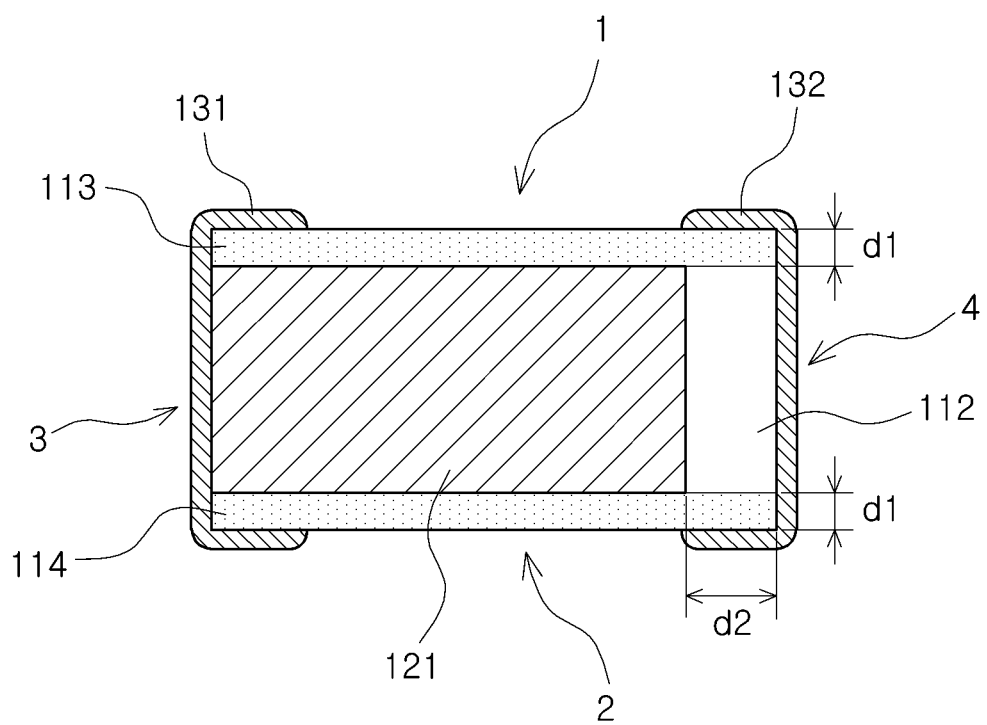
FIG. 5 is an upper plan view showing one dielectric layer configuring the multilayer ceramic capacitor shown in FIG. 1.

FIG. 4 is a cross-sectional view taken along line A-A' of FIG. 1, and FIG. 5 is an upper plan view showing one dielectric layer configuring the multilayer ceramic capacitor shown in FIG. 1.

Referring to FIGS. 1 through 5, the multilayer ceramic capacitor according to the embodiment of the present invention may include a ceramic body 110; a plurality of internal electrodes 121 and 122 formed in the ceramic body; and external electrodes 131 and 132 formed on an outer surface of the ceramic body.

The ceramic body 110 may have a first side surface 1 and a second side surface 2 opposing each other, and a third end surface 3 and a fourth end surface 4 connecting the first side surface and the second side surface to each other.

The ceramic body 110 is not specifically limited in view of a shape, but may generally have a rectangular parallelepiped shape.

The plurality of internal electrodes 121 and 122 formed in the ceramic body 110 may have respective one ends exposed to the third end surface 3 or the fourth end surface 4 of the ceramic body.

The internal electrodes 121 and 122 may be configured of a pair of a first internal electrode 121 and a second internal electrode 122 having opposing polarities. One end of the first internal electrode 121 may be exposed to the third end surface 3 and one end of the second internal electrode 122 may be exposed to the fourth end surface 4. The other ends of the first internal electrode 121 and the second internal electrode 122 may be formed so as to have a predetermined interval from the third end surface 3 or the fourth end surface 4. A more detailed description thereof will be described below.

The third end surface 3 and the fourth end surface 4 of the ceramic body may have the first and second external electrodes 131 and 132 formed thereon to be electrically connected to the internal electrodes.

The plurality of internal electrodes may be formed in the ceramic body, and a distance d1 from respective edges of the plurality of internal electrodes to the first side surface or the second side surface may be 18 μm or less. This means that the distance d1 from the edge of the plurality of internal electrodes to the first side surface or the second surface is 18 μm or less on average.

The edges of the internal electrode may be sides of the internal electrode adjacent to the first side surface 1 or the second side surface 2 of the ceramic body. A region from the edge of the internal electrode to the first side surface or the second side surface may refer to a first side margin part 113 or a second side margin part 114.

The distance d1 from the edge of the internal electrode to the first side surface 1 or the second side surface 2 may be slightly different between the plurality of internal electrodes, but according to the embodiment of the present invention, the difference in the distance d1 may be small or may not be generated.

The above-described features may be more clearly appreciated through a method of manufacturing a multilayer ceramic capacitor according to an embodiment of the present invention.

According to the embodiment of the present invention, the ceramic body 110 may include a multilayer body 111 having a plurality of dielectric layers 112 stacked therein and the first side margin part 113 and the second side margin part 114 formed on both side surfaces of the multilayer body. In this case, the distance d1 from respective edges of the plurality of internal electrodes to the first side surface or the second side surface is formed by the first side margin part 113 and the second side margin part 114 and corresponds to a thickness of the first side margin part 113 or the second side margin part 114.

The plurality of dielectric layers 112 configuring the multilayer body 111 is in a sintered state and may be integrated so as not to confirm a boundary between the dielectric layers adjacent to each other.

A length of the multilayer body 111 corresponds to a length of the ceramic body 110, and the length of the ceramic body 110 corresponds to a distance from the third end surface 3 to the fourth end surface 4 of the ceramic body. That is, the third and fourth end surfaces of the ceramic body 110 may be appreciated as being the third end surface and the fourth end surface of the multilayer body 111.

The multilayer body 111 is formed by stacking the plurality of dielectric layers 112, and a length of the dielectric layer 112 corresponds to the distance from the third end surface 3 to the fourth end surface 4 of the ceramic body.

The length of the ceramic body according to the embodiment of the present invention may be 400 to 1400 μm, but the present invention is not limited thereto. More specifically, the length of the ceramic body may be 400 to 800 μm, or 600 to 1400 μm.

The internal electrodes 121 and 122 may be formed on the dielectric layer, and the internal electrodes 121 and 122 may be formed in the ceramic body while having one dielectric layer therebetween through sintering.

Referring to FIG. 5, the first internal electrode 121 may be formed on the dielectric layer 112. The first internal electrode 121 is not entirely formed in a length direction of the dielectric layer. That is, one end of the first internal electrode 121 may be formed so as to have a predetermined interval d2 from the fourth end surface 4 of the ceramic body, and the other end of the first internal electrode 121 may be formed to the third end surface 3 to thereby be exposed to the third end surface 3.

The other end of the first internal electrode exposed to the third end surface 3 of the multilayer body may be connected to the first external electrode 131.

Contrary to the first internal electrode, one end of the second internal electrode 122 may be formed so as to have a predetermined interval from the third end surface 3, and the other end of the second internal electrode 122 may be exposed to the fourth end surface 4 to thereby be connected to the second external electrode 132.

The dielectric layer 112 may have the same width as that of the first internal electrode 121. That is, the first internal electrode 121 may be entirely formed on the dielectric layer 112 in the width direction thereof. A width of the dielectric layer and a width of the internal electrode may be based on the first side surface and the second side surface of the ceramic body.

The width of the dielectric layer and the width of the internal electrode according to the embodiment of the present invention may be 100 to 900 μm, but the present invention is not limited thereto. More specifically, the width of the dielectric layer and the width of the internal electrode may be 100 to 500 μm, or 100 to 900 μm.

As the ceramic body is miniaturized, the thickness of the side margin part may have an influence on electrical properties of the multilayer ceramic capacitor. According to the embodiment of the present invention, the thickness of the side margin part is formed to be 18 μm or less, thereby improving the electrical properties of the miniaturized multilayer ceramic capacitor.

In the embodiment of the present invention, the internal electrode and the dielectric layer may be cut simultaneously to be formed, and may have the same width. A more detailed description thereof will be described below.

In the embodiment of the invention, the width of the dielectric layer is the same as the width of the internal electrode, and the edges of the internal electrode may be exposed to the first and second side surfaces of the multilayer body. Both side surfaces of the multilayer body to which the edges of the internal electrode are exposed may be provided with the first side margin part 113 and the second side margin part 114.

As described above, the distance d1 from the respective edges of the plurality of internal electrodes to the first side surface or the second side surface corresponds to the thickness of the first side margin part 113 or the second side margin part 114.

The first side margin part 113 and the second side margin part 114 may have a thickness of 18 μm or less. As the thickness of the first side margin part 113 or the second side margin part 114 is reduced, an overlap area of the internal electrodes formed in the ceramic body may be relatively increased.

As far as the first side margin part 113 and the second side margin part 114 have a thickness sufficient to prevent short circuits of the internal electrodes exposed to the side surfaces of the multilayer body 111, the thickness of the first side margin part 113 or the second side margin part 114 is not particularly limited. For example, the first side margin part 113 and the second side margin part 114 may have a thickness of 2 μm or more.

In the case in which the thickness of the first and second side margin parts is less than 2 μm, mechanical strength against external impacts may be deteriorated, and in the case in which the thickness of the first and second side margin parts is above 18 μm, the overlap area of the internal electrodes is relatively decreased, such that it may be difficult to secure high capacitance of the multilayer ceramic capacitor.

According to the embodiment of the present invention, the first side margin part 113 and the second side margin part 114 may be formed of ceramic slurry. It is easy to control the thickness of the first side margin part 113 and the second side margin part 114 by controlling an amount of the ceramic slurry, and the thickness thereof may be 18 μm or less, a small thickness.

The thickness of the first side margin part 113 and the second side margin part 114 may mean an average thickness of the margin parts.

The average thickness of the first side margin part 113 and the second side margin part 114 may be measured by scanning an image of the cross section of the ceramic body 110 in a width direction thereof using a scanning electron microscope (SEM).

For example, with respect to either of the first side margin part 113 and the second side margin part 114 extracted from the image obtained by scanning the cross section of the ceramic body 110 in a width-thickness (W-T) direction that is cut in a central portion of the ceramic body 110 in a length (L)

direction using the SEM as shown in FIG. 5, thicknesses at any three points of the upper, middle, and lower portions of either of the margin parts in the thickness direction of the ceramic body may be measured to obtain an average value, as shown in FIG. 5.

In order to significantly increase the capacitance of the multilayer ceramic capacitor, methods for thinning the dielectric layers, stacking the thinned dielectric layers, and improving coverage of the internal electrodes have been considered. In addition, a method of increasing an overlap area of the internal electrodes forming capacitance has been considered. In order to increase the overlap area of the internal electrodes, the margin parts in which the internal electrodes are not formed are significantly decreased. In particular, as the multilayer ceramic capacitor is miniaturized, the margin parts need to be significantly decreased in order to increase the overlap area of the internal electrodes.

According to the embodiment of the present invention, the internal electrode is formed across the entire dielectric layer in the width direction thereof, and the thickness of the side margin part is set to be 18 μm or less, such that the overlap area of the internal electrodes is large.

In general, as the dielectric layers are highly stacked, the thicknesses of the dielectric layer and the internal electrode are reduced. Therefore, short-circuits between the internal electrodes may frequently occur. In addition, in the case in which the internal electrode is partially formed on the dielectric layer, a step portion may be generated by the internal electrode to deteriorate accelerated life span or reliability of an insulation resistance.

However, according to the embodiment of the present invention, even in the case that internal electrode and the dielectric layer are formed to have a reduced thickness, since the internal electrode is entirely formed across the dielectric layer in the width direction thereof, the overlap area of the internal electrodes may be increased to significantly increase the capacitance of the multilayer ceramic capacitor.

In addition, the step portion generated by the internal electrode is decreased to improve the accelerated life span of the insulation resistance, such that a multilayer ceramic capacitor having excellent capacitance properties and excellent reliability can be provided.

Meanwhile, the ceramic body 110 may include an effective layer contributing to capacitance formation and a cover layer C provided on at least one of an upper portion and a lower portion of the effective layer.

According to the embodiment of the present invention, when an average grain size of dielectric grains in first side margin part 113 and the second side margin part 114 is defined by Gw, an average grain size of dielectric grains in the cover layer C is defined by Gt, and an average grain size of dielectric grains of the effective layer is defined by Ga, Gw<Gt<Ga may be satisfied.

As described above, a decrease in moisture-resistance characteristics due to a non-compression area between the ceramic body and the side margin parts may be prevented by controlling the average grain size of the dielectric grains for each region, thereby implementing a multilayer ceramic capacitor having high capacitance.

Specifically, according to the embodiment of the present invention, the average grain size Gw of the dielectric grains in the first side margin part 113 and the second side margin part 114 is smaller than the average grain size Gt of the dielectric grains in the cover layer C, and the average grain size Gt of the dielectric grains of the cover layer C is smaller than the average grain size Ga of the dielectric grains of the effective layer.

The average grain sizes of the dielectric grains for respective regions are controlled as described above, such that the defect of a non-compression area between the ceramic body and the side margin parts may be solved in consideration of differences in sintering shrinkage behavior for respective regions at the time of sintering the ceramic body.

That is, sintering shrinkage behavior in the ceramic body may be performed in a sequence from the effective layer to the cover layer, and the side margin parts, and in this case, when the average grain sizes of the dielectric grains in respective regions are the same as or similar to each other, a non-compression area may be generated between the ceramic body and the side margin parts due to a difference in sintering shrinkage.

Referring to FIG. 3, the side margin parts may be in contact with the effective layer and the cover layer, and the non-compression area may be generated between the ceramic body and the side margin parts due to the difference in sintering shrinkage.

Therefore, in the case in which average grain sizes of dielectric grains in respective regions are controlled, differences in sintering shrinkage between the regions may be significantly decreased to prevent the decrease in the moisture-resistance characteristics due to the non-compression area between the ceramic body and the side margin parts.

The average grain size Gw of the dielectric grains in the first side margin part 113 and the second side margin part 114 is not particularly limited, but for example, may be 100 to 120 nm.

In the case in which the average grain size Gw of the dielectric grains in the first side margin part 113 and the second side margin part 114 is less than 100 nm, cracks may occur at the time of sintering.

In addition, in the case in which the average grain size Gw of the dielectric grains in the first side margin part 113 and the second side margin part 114 is more than 120 nm, the moisture-resistance characteristics may be deteriorated and thus, the manufactured ceramic multilayer body may be vulnerable to external impacts.

The average grain size Ga of the dielectric grains in the effective layer is not particularly limited, but for example, may be 150 to 160 nm.

In the case in which the average grain size Ga of the dielectric grains in the effective layer is less than 150 nm, cracks may occur at the time of sintering.

In the case in which the average grain size Ga of the dielectric grains in the effective layer is more than 160 nm, the moisture-resistance characteristics may be deteriorated, and the manufactured ceramic multilayer body may be vulnerable to external impacts.

The average grain size Gt of the dielectric grains in the cover layer C is not particularly limited, and may be larger than the average grain size Gw of the dielectric grains in the first side margin part 113 and the second side margin part 114 or smaller than the average grain size Ga of the dielectric grains in the effective layer.

The average grain size Gt of the dielectric grains in the cover layer C may appropriately controlled according to an object of the present invention, but is not limited thereto.

The average grain size of the dielectric grains for respective regions may be controlled by controlling an average grain size of ceramic grains for respective regions used at the time of manufacturing the multilayer ceramic capacitor.

That is, according to the embodiment of the present invention, when a multilayer ceramic capacitor is manufactured in order to implement the average grain size of dielectric grains for respective regions, the average grain size of ceramic grains may be applied to respective regions differently.

A detailed description thereof will be described below.

A method of manufacturing a multilayer ceramic capacitor according to an embodiment of the present invention may include: forming a plurality of ceramic green sheets by using a first ceramic slurry containing a first ceramic dielectric powder; printing a first internal electrode pattern or a second internal electrode pattern on the respective ceramic green sheets; stacking the plurality of ceramic green sheets such that the first internal electrode pattern and the second internal electrode pattern are alternately stacked to form an effective layer contributing to capacitance formation, and stacking ceramic green sheets formed by using a second ceramic slurry containing a second ceramic dielectric powder having a grain size smaller than that of the first ceramic dielectric powder on at least one of an upper portion and a lower portion of the effective layer to form a cover layer, thereby preparing a ceramic body having first and second side surfaces facing each other and third and fourth end surfaces connecting the first and second side surfaces; and forming a first side margin part and a second side margin part by applying a third ceramic slurry containing a third ceramic dielectric powder having a grain size smaller than that of the second ceramic dielectric powder to the respective first and second side surfaces.

Hereinafter, a method of manufacturing a multilayer ceramic capacitor according to an embodiment of the present invention will be described.

FIGS. 6A through 6F are cross-sectional view and perspective view schematically showing a method of manufacturing a multilayer ceramic capacitor according to an embodiment of the present invention.

Figure 6A:
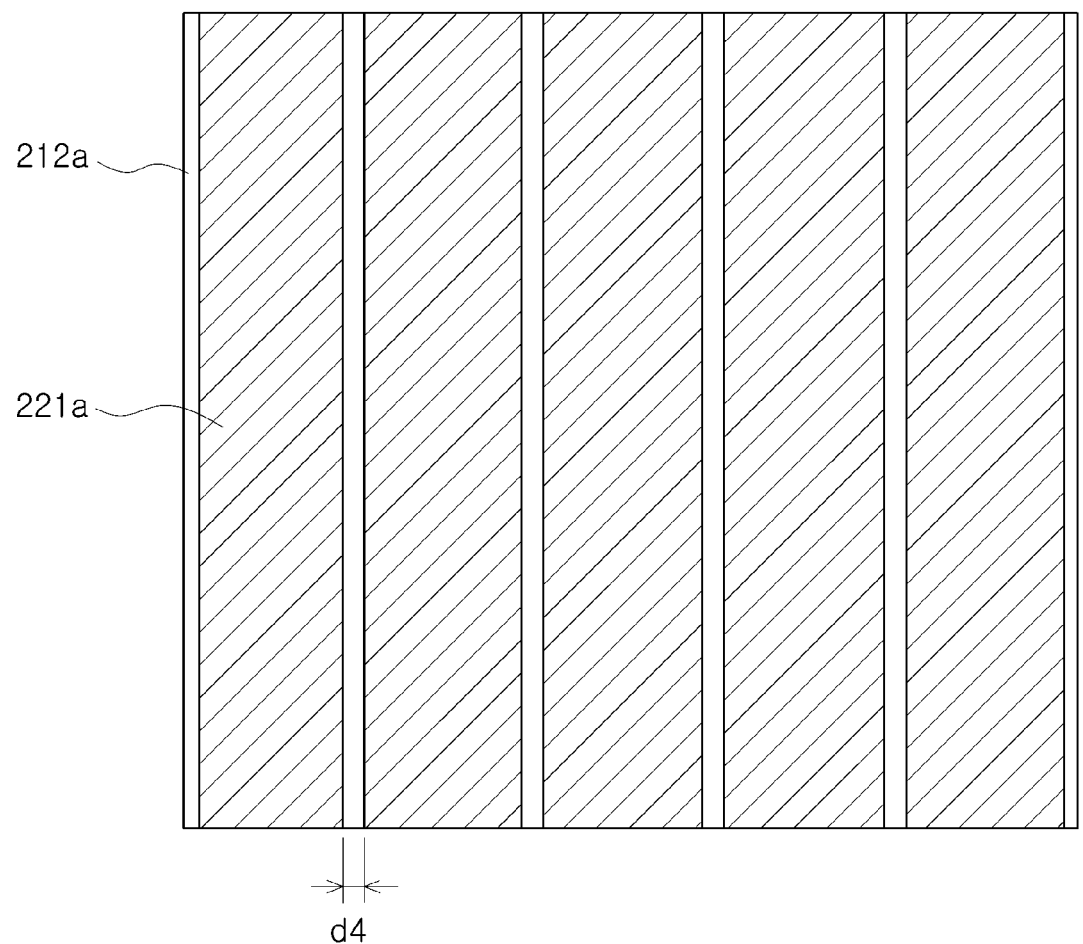
FIGS. 6A through 6F are cross-sectional views and perspective views schematically showing a method of manufacturing a multilayer ceramic capacitor according to an embodiment of the present invention.

As shown in FIG. 6A, a plurality of stripe shaped first internal electrode patterns 221a may be formed on a ceramic green sheet 212a so as to have a predetermined interval d4 therebetween. The plurality of stripe shaped first internal electrode patterns 121a may be formed in parallel with each other.

The predetermined interval d4, which corresponds to a distance for insulation between the internal and the external electrode having opposing polarities, may be a distance corresponding to d2×2 shown in FIG. 5.

The ceramic green sheet 212a may be formed of the first ceramic slurry including the first ceramic dielectric powder, an organic solvent, and an organic binder.

As the first ceramic dielectric powder, a material having high permittivity, such as a barium titanate ($BaTiO_3$) based material, a lead complex perovskite based material, a strontium titanate ($SrTiO_3$) based material, or the like may be used, but is not limited thereto, and preferably, a barium titanate ($BaTiO_3$) powder may be used.

The stripe shaped first internal electrode patterns 221a may be formed of an internal electrode paste including a conductive metal. The conductive metal may be Ni, Cu, Pd, or an alloy thereof, but is not limited thereto.

A method of forming the stripe shaped first internal electrode patterns 221a on the ceramic green sheet 212a is not particularly limited, but for example, a printing method such as a screen printing method or a gravure printing method may be used.

In addition, although not shown, a plurality of stripe shaped second internal electrode patterns 222a may be formed on another ceramic green sheet 212a so as to have a predetermined interval.

Hereinafter, the ceramic green sheet having the first internal electrode patterns 221a formed thereon may refer to a first ceramic green sheet and the ceramic green sheet having the second internal electrode pattern 222a formed thereon may refer to a second ceramic green sheet.

Figure 6B:
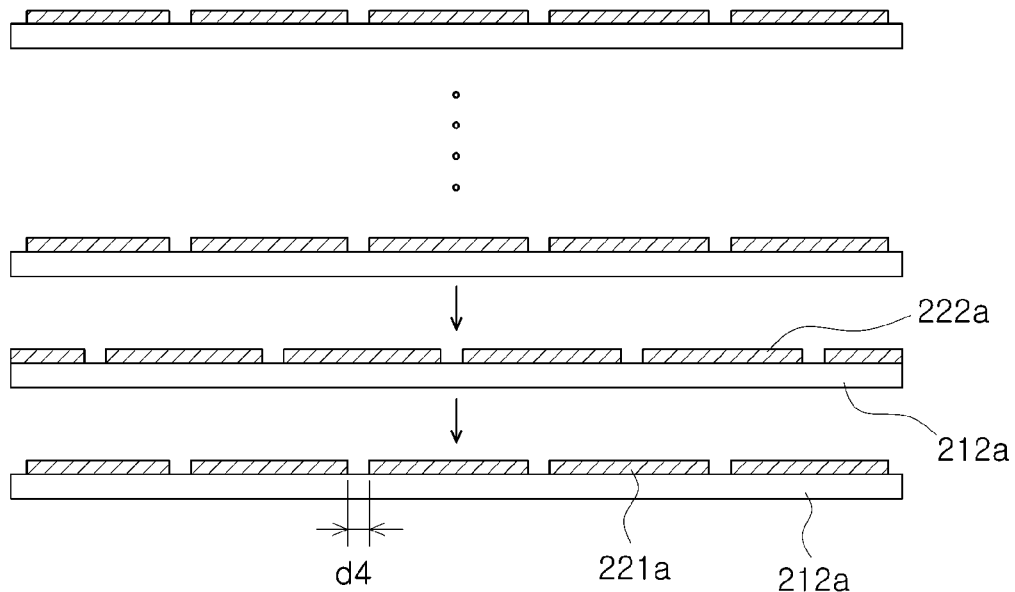

Then, as shown in FIG. 6B, the first and second ceramic green sheets may be alternately stacked such that the stripe shaped first internal electrode patterns 221a and the stripe shaped second internal electrode patterns 222a intersect with one another.

Next, the stripe shaped first internal electrode patterns 221a may form the first internal electrodes 221, and the stripe shaped second internal electrode patterns 222a may form the second internal electrodes 222.

Therefore, the effective layer contributing to capacitance formation may be formed, and then the cover layer C may be formed on at least one of the upper portion and the lower portion of the effective layer by stacking the ceramic green sheets formed of the second ceramic slurry including the second ceramic dielectric powder having a grain size smaller than that of the first ceramic dielectric powder.

The ceramic green sheet may be formed by the same method as the ceramic green sheet used for forming the effective layer, except that the second ceramic slurry including the second ceramic dielectric powder having a grain size smaller than that of the first ceramic dielectric powder is used therefor.

Figure 6C:
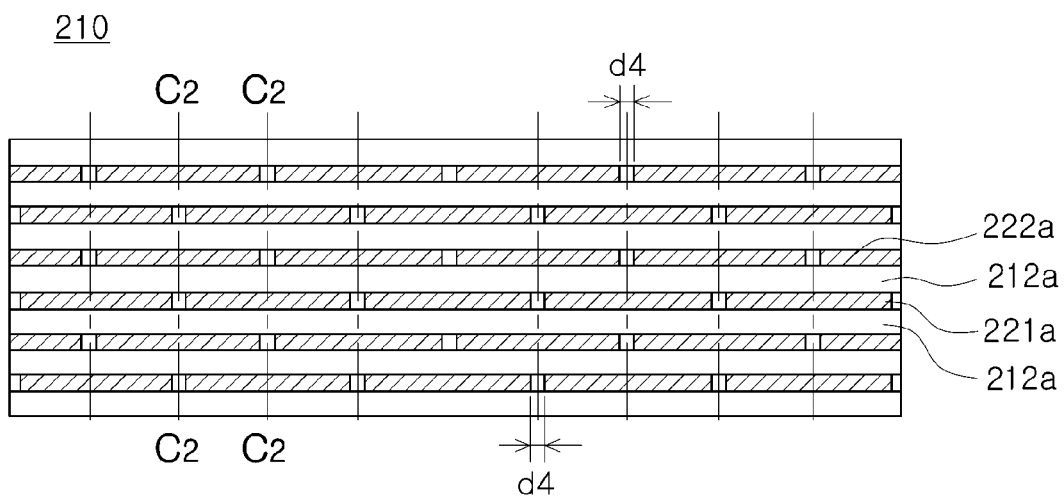
Figure 6D:
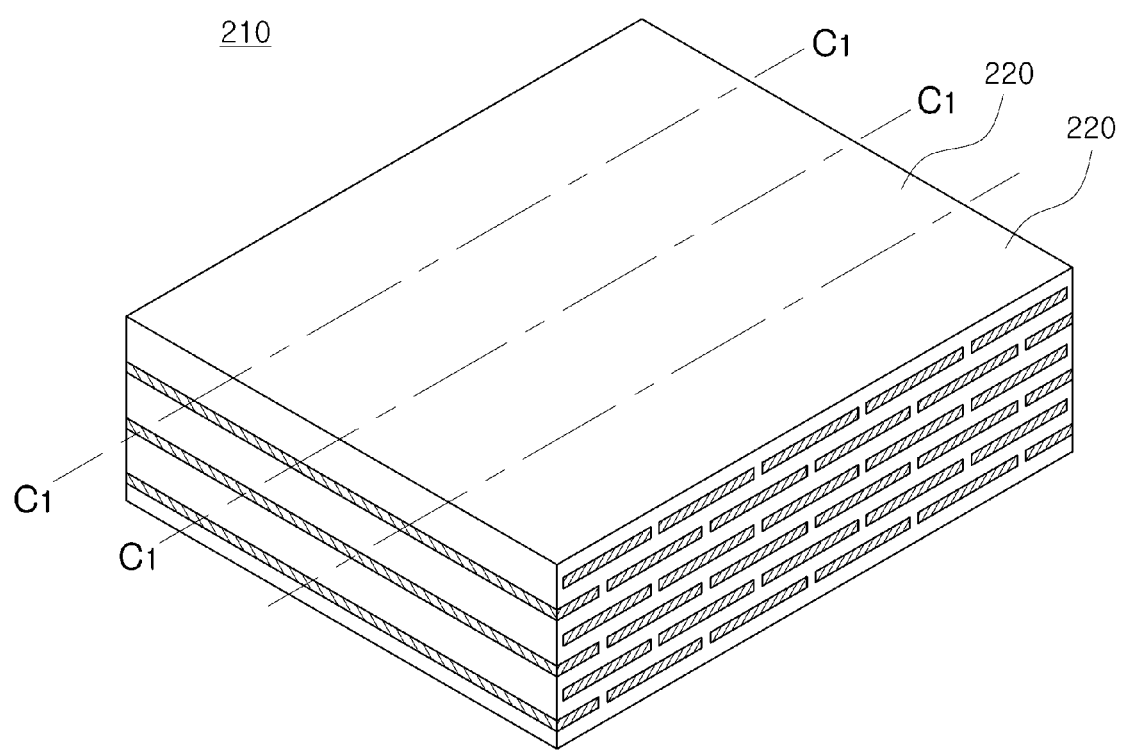

FIG. 6C is a cross-sectional view showing a ceramic green sheet multilayer body 210 having the first and second ceramic green sheets stacked therein according to the embodiment of the invention, and FIG. 6D is a perspective view showing the ceramic green sheet multilayer body 210 having the first and second ceramic green sheets stacked therein according to the embodiment of the invention.

Referring to FIGS. 6C and 6D, the first ceramic green sheet having the plurality of stripe shaped first internal electrode patterns 221a printed thereon in parallel with each other and the second ceramic green sheet having the plurality of stripe shaped second internal electrode patterns 222a printed thereon in parallel with each other are alternately stacked.

More specifically, the first and second ceramic green sheets are alternately stacked such that a central portion of the stripe shaped first internal electrode pattern 221a printed on the first ceramic green sheet and the interval d4 between the stripe shaped second internal electrode patterns 222a printed on the second ceramic green sheet may be overlapped with each other.

Then, as shown in FIG. 6D, the ceramic green sheet multilayer body 210 may be cut to traverse the plurality of stripe shaped first internal electrode patterns 221a and the plurality of stripe shaped second internal electrode patterns 222a. That is, the ceramic green sheet multilayer body 210 may be cut along a cutting line C1-C1, such that a bar shaped multilayer body 220 may be formed.

More specifically, the stripe shaped first internal electrode patterns 221a and the stripe shaped second internal electrode patterns 222a may be cut in the length direction to be divided into a plurality of internal electrodes having a predetermined width. Here, the stacked ceramic green sheets are cut together with the internal electrode patterns. Therefore, the dielectric layer may be formed to have the same width as that of the internal electrode.

Through the cut surface of the bar shaped multilayer body 220, edges of the first and second internal electrodes may be exposed. The cut surface of the bar shaped multilayer body may refer to the first side surface and the second side surface of the bar shaped multilayer body, respectively.

Figure 6E:
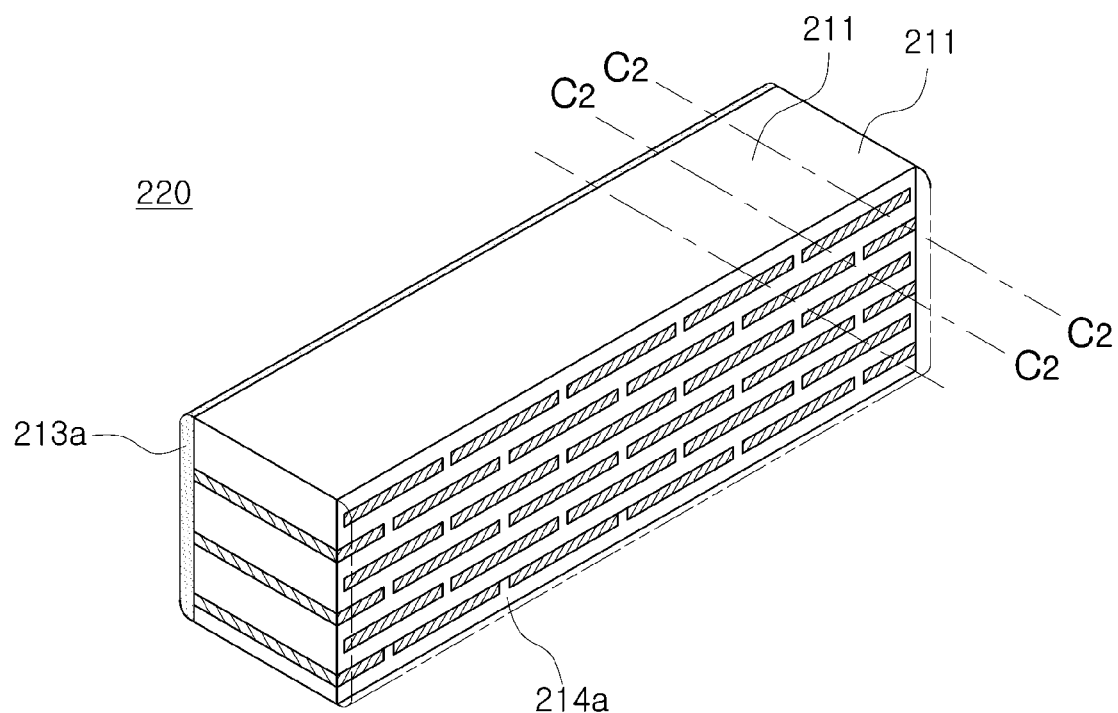

Then, as shown in FIG. 6E, the first and second side surfaces of the bar shaped multilayer body 220 may be provided with a first side margin part 213a and a second side margin part 214a, respectively. The second side margin part 214a is not clearly shown, but the outline thereof is shown by dotted lines.

It may be appreciated that the first and second side surfaces of the bar shaped multilayer body 220 correspond to the first side surface 1 and the second side surface 2 of the multilayer body 111 shown in FIG. 5.

The first and second side margin parts 213a and 214a may be formed of the third ceramic slurry including the third ceramic dielectric powder having a grain size smaller than that of the second ceramic dielectric powder on the bar shaped multilayer body 220.

The third ceramic slurry may include the third ceramic dielectric powder, the organic binder, and the organic solvent, and an amount of the third ceramic slurry may be controlled such that the first and second side margin parts 213a and 214a have a desired thickness.

The first and second side margin parts 213a and 214a may be formed on the first and second side surfaces of the bar shaped multilayer body 220 by applying the third ceramic slurry thereto. A method of applying the third ceramic slurry is not particularly limited. For example, the ceramic slurry may be sprayed by a spraying method or may be applied using a roller.

In addition, the first and second side margin parts 213a and 214a may be formed on the first and second side surfaces of the bar shaped multilayer body by dipping the bar shaped multilayer body into the third ceramic slurry.

As described above, the first side margin part and the second side margin part may have an average thickness of 18 μm or less. The thickness of the first and the second side margin parts may be defined based on the first side surface or the second side surface of the bar shaped multilayer body to which the edges of the internal electrode are exposed.

Then, a sintering process may be performed on the bar shaped multilayer body. The sintering process may be performed under $N_2$—$H_2$ atmosphere at 800 to 1200° C., but is not limited thereto.

Figure 6F:
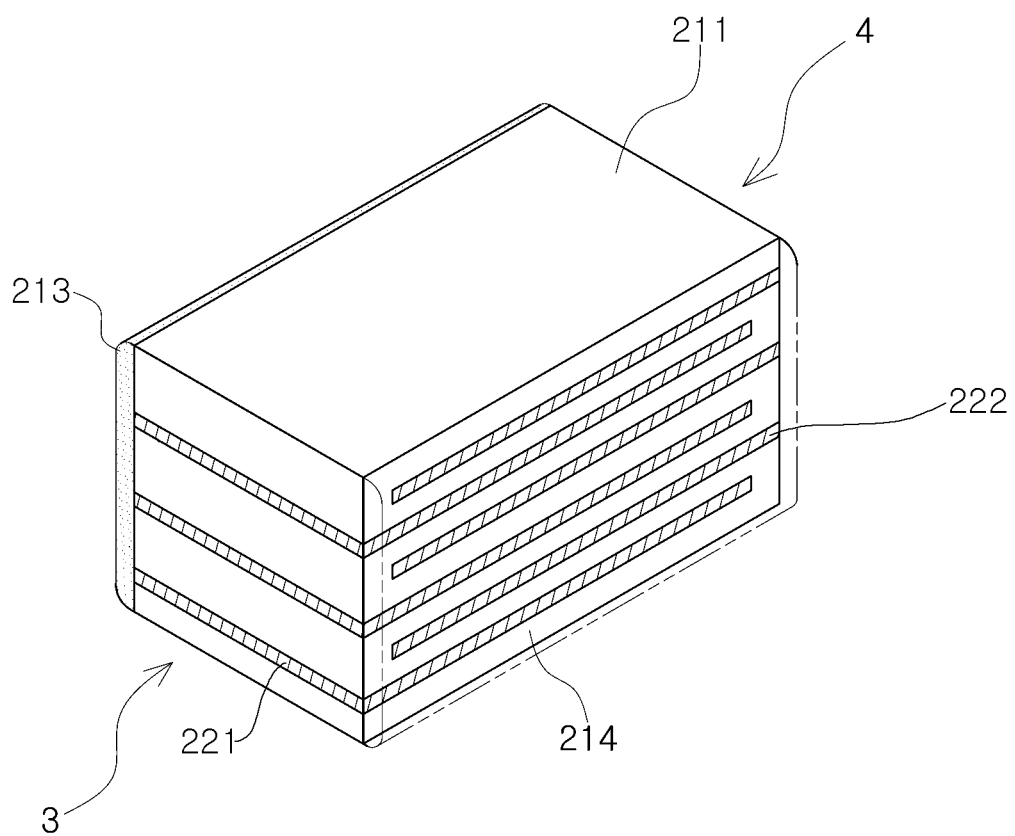

Next, as shown in FIGS. 6E and 6F, the bar shaped multilayer body 220 having the first and second side margin parts 213a and 214a formed thereon may be cut along a cutting line C2-C2 so as to correspond to individual chip size. FIG. 6C may be used to recognize a position of the cutting line C2-C2.

The bar shaped multilayer body 220 is cut to have a chip size, whereby a ceramic body having the multilayer body 211 and the first and second side margin parts 213 and 214 formed on both side surfaces of the multilayer body may be formed.

Since the bar shaped multilayer body 220 is cut along the cutting line C2-C2, the central portion of the first internal electrode and the predetermined interval d4 formed between the second internal electrodes overlapped with each other may be cut along the same cutting line. From a different point of view, the central portion of the second internal electrode and the predetermined interval formed between the first internal electrodes may be cut along the same cutting line.

Therefore, respective one ends of the first internal electrode and the second internal electrode may be alternately exposed to the cutting line C2-C2. A surface to which the first internal electrode is exposed may be the third end surface 3 of the multilayer body shown in FIG. 6, and a surface to which the second internal electrode is exposed may be the fourth end surface 4 of the multilayer body shown in FIG. 6.

The bar shaped multilayer body 220 is cut along the cutting line C2-C2, such that the predetermined interval d4 between the stripe shaped first internal electrode patterns 221a is cut into half, as a result, one end of the first internal electrode 121 may be spaced apart from the fourth end surface by the predetermined interval d2. In addition, the second internal electrode 122 may be spaced apart from the third end surface by a predetermined interval.

Then, the third end surface and the fourth end surface may have external electrodes formed thereon to be connected to one ends of the first and second internal electrodes, respectively.

As described in the embodiment of the present invention, in the case in which the first and second side margin parts are formed on the bar shaped multilayer body 220 and the bar shaped multilayer body 220 is cut into a plurality of multilayer bodies having a chip size, the side margin parts may be formed on the plurality of multilayer bodies 111 through a single process.

In addition, although not shown, the bar shaped multilayer body may be cut to have a chip size to thereby form the plurality of multilayer bodies before the first and second side margin parts are formed.

That is, the bar shaped multilayer body may be cut such that the central portion of the first internal electrode and the predetermined interval formed between the second internal electrodes overlapped with each other are cut along the same cutting line. Therefore, respective one ends of the first internal electrode and the second internal electrode may be alternately exposed to the cut surface.

Then, the first and second side surfaces of the multilayer body may be provided with the first side margin part and the second side margin part. A method of forming the first and second side margin parts has been described above.

Further, the third end surface of the multilayer body to which the first internal electrode is exposed and the fourth end surface of the multilayer body to which the second internal electrode is exposed may have the external electrodes formed thereon, respectively.

According to another embodiment of the invention, the edges of the first and second internal electrodes are exposed through the first and second side surfaces of the multilayer body. The plurality of stacked first and second internal electrodes may be simultaneously cut, such that the edges of the internal electrodes may be positioned on a single straight line. Then, the first and second side surfaces of the multilayer body may be provided simultaneously with the first and second side margin parts. The multilayer body and the first and second side margin parts may form the ceramic body. That is, the first and second side margin parts may form the first and second side surfaces of the ceramic body.

According to the embodiment of the present invention, a multilayer ceramic capacitor having high degrees of reliability and capacitance as well as increased moisture-resistance characteristics may be implemented by controlling the grain sizes of the ceramic dielectric powders for respective regions.

Table 1 below shows comparison results of the reliability according to the average grain size Gw of the dielectric grains in the first side margin part and the second side margin part, the average grain size Gt of the dielectric grains in the cover layer, and the average grain size Ga of the dielectric grains in the effective layer with regard to an average thickness of side margin parts of the multilayer ceramic capacitors.

TABLE 1

| Sample No. | Average Thickness of Side Margin Parts (μm) | Whether Gw < Gt < Ga is Satisfied (O/X) | Reliability Evaluation (Number of Crack Occurrence/Total Number) |
|---|---|---|---|
| *1 | 16 | X | 3/200 |
| *2 | 17 | X | 2/200 |
| *3 | 18 | X | 2/200 |
| 4 | 19 | X | 0/200 |
| 5 | 20 | X | 0/200 |
| 6 | 21 | X | 0/200 |

Referring to FIG. 1 above, samples 1 to 3, which correspond to the case in which the average thickness of the side margin parts is 18 μm or less, have a defect in a reliability test when Gw<Gt<Ga are not satisfied.

Samples 4 to 6, which correspond to the case in which the average thickness of the side margin parts exceeds 18 μm, showed an excellent result in the reliability test even when Gw<Gt<Ga are not satisfied.

Therefore, according to the description below, it may be appreciated that when the multilayer ceramic capacitor according to the embodiment of the present invention has an average thickness of the side margin part of 18 μm or less, reliability thereof is improved.

Table 2 below shows comparison results of moisture-resistance characteristics and reliability according to the average grain size Gw of the dielectric grains in the first side margin part and the second side margin part, the average grain size Gt of the dielectric grains in the cover layer, and the average grain size Ga of the dielectric grains in the effective layer when the average thickness of the side margin parts is 18 μm or less.

TABLE 2

| Sample No. | Average Thickness of Side Margin Parts (μm) | Average Grain Size of Dielectric Grains in Side Margin Part (Gw) (μm) | Average Grain Size of Dielectric Grains in Cover Layer (Gt) (μm) | Average Grain Size of Dielectric Grains in Effective Layer (Ga) (μm) | Whether Gw < Gt < Ga (O/X) is Satisfied | Evaluation on Moisture-Resistance Characteristics | Reliability Evaluation (Number of Crack Occurrence/Total Number) |
|---|---|---|---|---|---|---|---|
| 7 | 10.3 | 138 | 152 | 172 | O | O | 0/200 |
| 8 | 12.6 | 126 | 137 | 162 | O | O | 0/200 |
| 9 | 15.2 | 139 | 162 | 175 | O | O | 0/200 |
| *10 | 14.2 | 132 | 178 | 165 | X | X | 2/200 |
| *11 | 15.4 | 182 | 169 | 165 | X | X | 1/200 |
| *12 | 12.3 | 175 | 172 | 168 | X | X | 2/200 |
| 13 | 16.2 | 215 | 230 | 246 | O | O | 0/200 |
| 14 | 14.5 | 202 | 212 | 232 | O | O | 0/200 |
| 15 | 14.3 | 198 | 220 | 229 | O | O | 0/200 |
| *16 | 11.3 | 239 | 265 | 255 | X | X | 1/200 |
| *17 | 12.3 | 247 | 245 | 251 | X | X | 3/200 |
| *18 | 11.8 | 228 | 231 | 225 | X | X | 3/200 |
| 19 | 13.5 | 255 | 272 | 282 | O | O | 0/200 |
| 20 | 12.9 | 245 | 252 | 272 | O | O | 0/200 |
| 21 | 12.1 | 239 | 263 | 277 | O | O | 0/200 |
| *22 | 10.3 | 372 | 285 | 285 | X | X | 5/200 |
| *23 | 12.6 | 274 | 295 | 232 | X | X | 3/200 |
| *24 | 15.2 | 291 | 285 | 278 | X | X | 3/200 |
| 25 | 14.2 | 289 | 294 | 301 | O | O | 0/200 |
| 26 | 15.4 | 264 | 276 | 298 | O | O | 0/200 |
| 27 | 12.3 | 288 | 298 | 312 | O | O | 0/200 |

*Comparative Example

In Table 2, the moisture-resistance characteristics were evaluated by mounting 200 chips on a substrate under moisture conditions of 8585 (85° C., 85% humidity), and reliability was evaluated by whether or not cracks occurred at the time of break down analysis after polishing the chip, and in detail, after the chip was immersed in a Pb bath at 320° C. for 2 seconds, a test to see whether or not thermal shock cracks occurred was performed.

In Table 2 above, the case in which the moisture-resistance characteristics are excellent is indicated by "o", and the case in which the moisture-resistance characteristics are poor is indicated by "x".

It may be appreciated from Table 2 above that in the case in which the average grain size Gw of the dielectric grains in the first side margin part and the second side margin part, the average grain size Gt of the dielectric grains in the cover layer, and the average grain size Ga of the dielectric grains in the effective layer satisfy the numerical ranges of the present invention, and simultaneously satisfy the Gw<Gt<Ga, the moisture-resistance characteristics are improved, and reliability is also improved.

As set forth above, according to the embodiments of the present invention, the multilayer ceramic capacitor having high reliability, high capacitance, and increased moisture-resistance characteristics may be implemented by controlling the average grain size of the dielectric grains in the first side margin part and the second side margin part, the average grain size of the dielectric grains in the cover layer, and the average grain size of the dielectric grains in the effective layer.

In addition, according to the multilayer ceramic capacitor, the distance from respective edges of the internal electrode to the first side surface or the second side surface may be small. Therefore, the overlap area of the internal electrodes formed in the ceramic body may be largely formed.

Further, the distance from the edge of the internal electrode disposed in the uppermost or lowermost position among internal electrodes (the outermost edge portion from which it may be relatively difficult to remove remaining carbon) to the first side surface or the second side surface is significantly small, such that the remaining carbon may be easily removed. Therefore, concentration distribution of the remaining carbon may be decreased to maintain a uniform micro structure, and the connectivity of the internal electrodes may be improved.

In addition, the shortest distance from the edge of the internal electrode disposed in the uppermost or lowermost position among internal electrodes to the first side surface or the second side surface may be secured at a predetermined thickness to increase the moisture-resistance characteristics, and internal defects may be significantly decreased. Further, at the time of forming the external electrode, possibility that radiation cracks will occur may be decreased, and mechanical strength to the external impacts may be secured.

According to the embodiments of the present invention, the plurality of stacked first and second internal electrodes, and the ceramic green sheets may be simultaneously cut, such that the edges of the internal electrode may be positioned on a single straight line. Then, the surfaces to which the edges of the internal electrode are exposed may be provided with the first and second side margin parts. The thickness of the side margin parts may be easily controlled according to the amount of the ceramic slurry.

The internal electrode may be entirely formed on the dielectric layer in the width direction thereof, such that the overlap area between the internal electrodes may be easily formed and the step portion generated by the internal electrode may be decreased.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body having first and second side surfaces facing each other, and third and fourth end surfaces connecting the first and second side surfaces;
   a plurality of internal electrodes formed in the ceramic body and having one ends thereof exposed to the third end surface or the fourth end surface; and
   a first side margin part and a second side margin part formed such that an average thickness thereof from the first and second side surfaces to edges of the internal electrodes is 18 μm or less, and
   wherein the ceramic body includes an effective layer contributing to capacitance formation and a cover layer provided on at least one of an upper portion and a lower portion of the effective layer, and when an average grain size of dielectric grains in the first side margin part and the second side margin part is defined by Gw, an average grain size of dielectric grains in the cover layer is defined by Gt, and an average grain size of dielectric grains in the effective layer is defined by Ga, Gw<Gt<Ga is satisfied.

2. The multilayer ceramic capacitor of claim 1, wherein the average grain size Gw of the dielectric grains in the first side margin part and the second side margin part is 100 to 120 nm.

3. The multilayer ceramic capacitor of claim 1, wherein the average grain size Ga of the dielectric grains in the effective layer is 150 to 160 nm.

4. The multilayer ceramic capacitor of claim 1, wherein the first side margin part and the second side margin part are formed of a ceramic slurry.

5. The multilayer ceramic capacitor of claim 1, wherein the internal electrodes includes a first internal electrode having one end exposed to the third end surface and the other end formed so as to have a predetermined interval from the fourth end surface, and a second internal electrode having one end exposed to the fourth end surface and the other end formed so as to have a predetermined interval from the third end surface.

6. A method of manufacturing a multilayer ceramic capacitor, the method comprising:
   forming a plurality of ceramic green sheets by using a first ceramic slurry containing a first ceramic dielectric powder;
   printing a first internal electrode pattern or a second internal electrode pattern on the respective ceramic green sheets;
   stacking the plurality of ceramic green sheets such that the first internal electrode pattern and the second internal electrode pattern are alternately stacked to form an effective layer contributing to capacitance formation, and stacking ceramic green sheets formed by using a second ceramic slurry containing a second ceramic dielectric powder having a grain size smaller than that of the first ceramic dielectric powder on at least one of an upper portion and a lower portion of the effective layer to form a cover layer, thereby preparing a ceramic body having first and second side surfaces facing each other and third and fourth end surfaces connecting the first and second side surfaces; and
   forming a first side margin part and a second side margin part by applying a third ceramic slurry containing a third ceramic dielectric powder having a grain size smaller than that of the second ceramic dielectric powder to the respective first and second side surfaces.

7. The method of claim 6, wherein when an average grain size of dielectric grains in the first side margin part and the second side margin part is defined by Gw, an average grain size of dielectric grains in the cover layer is defined by Gt, and an average grain size of dielectric grains in the effective layer is defined by Ga, Gw<Gt<Ga is satisfied.

8. The method of claim 6, wherein an average grain size Gw of dielectric grains in the first side margin part and the second side margin part is 100 to 120 nm.

9. The method of claim 6, wherein an average grain size Ga of dielectric grains in the effective layer is 150 to 160 nm.

10. The method of claim 6, wherein the plurality of ceramic green sheets, the first side margin part, and the second side margin part are sintered at a temperature of 800 to 1200° C.

11. The method of claim 6, further comprising forming a first external electrode and a second external electrode connected to the first internal electrode pattern exposed to the third end surface and the second internal electrode pattern exposed to the fourth end surface, respectively.

12. The method of claim 6, wherein the first side margin part and the second side margin part have an average thickness of 18 μm or less.

* * * * *